(12) United States Patent
Orlicki et al.

(10) Patent No.: US 7,560,520 B1
(45) Date of Patent: Jul. 14, 2009

(54) INTERFACE-DIRECTED BRANCHED POLYMER TRANSPORTS AND METHODS FOR PRODUCING SAME

(75) Inventors: Joshua A. Orlicki, Harve de Grace, MD (US); Robert E. Jensen, Newark, DE (US); Matthew S. Bratcher, Baldwin, MD (US); Steven H. McKnight, Newark, DE (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 345 days.

(21) Appl. No.: 11/267,262

(22) Filed: Nov. 7, 2005

Related U.S. Application Data

(60) Provisional application No. 60/626,501, filed on Nov. 8, 2004.

(51) Int. Cl.
  C08G 73/04 (2006.01)
  C08F 259/08 (2006.01)
  C08L 53/00 (2006.01)
  C08F 214/18 (2006.01)
  C08G 69/26 (2006.01)
  C07C 209/60 (2006.01)
  C07C 211/13 (2006.01)
  A61K 33/24 (2006.01)
  A61K 33/42 (2006.01)

(52) U.S. Cl. .................. 525/540; 525/276; 525/71; 525/200; 525/902; 528/332; 528/424; 564/487; 564/512; 424/604; 424/617; 424/646

(58) Field of Classification Search .......... 525/540, 525/276, 302, 71, 200, 902; 528/332, 424; 564/487, 512; 424/604, 617, 646
See application file for complete search history.

(56) References Cited

U.S. PATENT DOCUMENTS

| | | | |
|---|---|---|---|
| 4,631,337 A | * | 12/1986 | Tomalia et al. .......... 528/391 |
| 5,130,194 A | | 7/1992 | Baker |
| 5,567,372 A | | 10/1996 | Nohr |

(Continued)

OTHER PUBLICATIONS

Katsoulis, Dimitiris E., "A Survey of Applications of Polyoxometalates" Chem. Rev. 1998, 98, 359-387.

(Continued)

*Primary Examiner*—Mark Eashoo
*Assistant Examiner*—Michael Pepitone
(74) *Attorney, Agent, or Firm*—William W. Randolph; Christos S. Kyriakou

(57) ABSTRACT

Methods and systems for modifying a polymer are disclosed herein. A matrix is generally provided having a surface thereof, wherein the matrix comprises a plurality of hyperbranched polymers. The plurality of hyperbranched polymers can be chemically bound to a plurality of surfactants or order to modify the surface and produce a polymeric material thereof. The surface is tailored with a plurality of functional groups that self-assemble and are deliverable to the surface of the solution, including interfaces thereof, thereby permitting a high-density assembly of functional groups to operate in concert with one another in order to generate a modified surface thereof. The polymeric material produced thereof can be reversibly adaptable to environmental conditions through a blooming of varying surface functional group to the surface of the solution.

19 Claims, 9 Drawing Sheets

U.S. PATENT DOCUMENTS

| | | | |
|---|---|---|---|
| 5,569,732 A | 10/1996 | Nohr | |
| 5,620,788 A | 4/1997 | Garavaglia | |
| 5,635,544 A | 6/1997 | Tamura | |
| 5,731,095 A * | 3/1998 | Milco et al. | 428/482 |
| 5,780,644 A | 7/1998 | Gozzini | |
| 5,853,883 A | 12/1998 | Nohr | |
| 5,854,147 A | 12/1998 | Nohr | |
| 5,919,442 A | 7/1999 | Yin | |
| 5,938,934 A | 8/1999 | Balogh | |
| 5,954,966 A | 9/1999 | Matsura | |
| 6,127,507 A | 10/2000 | Santerre | |
| 6,177,414 B1 | 1/2001 | Tomalia | |
| 6,288,253 B1 | 9/2001 | Manzer | |
| 6,312,679 B1 | 11/2001 | Tomalia | |
| 6,444,758 B2 * | 9/2002 | McNamara et al. | 525/302 |
| 6,497,959 B1 | 12/2002 | Mhetar | |
| 6,579,906 B2 | 6/2003 | Cooper | |
| 6,590,056 B2 | 7/2003 | Won | |
| 6,617,397 B2 | 9/2003 | McNamara | |
| 6,635,720 B1 | 10/2003 | Tomalia | |
| 6,660,828 B2 | 12/2003 | Thomas | |
| 6,664,315 B2 | 12/2003 | Tomalia | |
| 6,855,773 B1 | 2/2005 | Jensen | |

OTHER PUBLICATIONS

Gouzerh, Pierre et al., "Main-Group Element, Organic and Organometallic Derivatives of Polyoxometalates" Chem. Rev. 1998, 98, 77-111.

Coronado, Eugenio et al., "Polyoxometalates-Based Molecular Materials" Chem. Rev. 1998, 98, 273-296.

* cited by examiner

FIG. 3A

HIGHLY BRANCHED POLYMER (HBP) SCAFFOLD + FLUOROSURFACTANT → HBP-FLUOROSURFACTANT COMPOUND

FIG. 3B

HBP-FLUOROSURFACTANT COMPOUND + ALIPHATIC EPOXY → HBP-FLUOROSURFACTANT-ALIPHATIC COMPOUND

INTERFACE-DIRECTED BRANCHED POLYMER TRANSPORTS AND METHODS FOR PRODUCING SAME

CLAIM OF PRIORITY

This application claims priority to U.S. provisional application entitled, "Interface-Directed Branched Polymer Transports," having Ser. No. 60/626,501, filed Nov. 8, 2004, which is entirely incorporated herein by reference.

STATEMENT OF GOVERNMENT INTEREST

The invention described herein may be manufactured and used by or for the United States Government for Governmental purposes without the payment of any royalties.

TECHNICAL FIELD

The present disclosure relates generally to polymers and polymer modification schemes thereof. The present disclosure also relates to hyperbranched polymers and multiple functional chemical groups and compounds thereof.

BACKGROUND

The invention is relates to U.S. Pat. No. 6,855,773 issued Feb. 15, 2005 to Robert Jensen et al., the teachings of which are fully incorporated herein by reference.

SUMMARY

Embodiments of the present invention provide methods and compositions for producing hyperbranched polymers with specialized functional groups. One embodiment of a method for producing the hyperbranched polymer for specialized functional groups includes the following steps: modifying a hyperbranched polymer (HBP) scaffold by addition of a fluorosurfactant to form a HBP compound with the fluorosurfactant substituent; modifying the HBP-fluorosurfactant compound by addition of an aliphatic compound to form a HBP compound substituted with the fluorosurfactant and the aliphatic substituent; and complexing the HBP compound substituted with the fluorosurfactant and the aliphatic substituent with a polyoxometalate (POM) to form a HBP-POM complex.

The present invention also includes modified HBP compositions. An exemplary composition may include a hyperbranched polymer modified with a plurality of first functional groups, where the first functional groups are chosen from at least one of: perfluorinated chains and aliphatic chains; and wherein the hyperbranched polymer is modified with a plurality of second functional groups, the second function groups are chosen from at least one of: a metal oxide, an acid, a base, a decontaminating agent, a biocide and a biological binding site.

The present invention further includes interface-directed branched polymer transport systems An exemplary system may include HBPs in a matrix; wherein the HBPs are complexed with polyoxometalate (POM) functional groups, wherein upon exposure to a contaminating substance to a surface of the matrix, the POM functional groups migrate to the surface of the matrix and decompose or inactivate the contaminating substance.

Other compositions, methods, systems, features, and advantages of the present disclosure will be or become apparent to one with skill in the art upon examination of the following drawings and detailed description. It is intended that all such additional compositions, methods, systems, features, and advantages be included within this description, be within the scope of the present disclosure, and be protected by the accompanying claims.

BRIEF DESCRIPTION OF THE DRAWINGS

The accompanying figures, in which like reference numerals refer to identical or functionally-similar elements throughout the separate views and which are incorporated in and form part of the specification, further illustrate the disclosed methods and, together with the detailed description, serve to explain the principles of the present disclosure.

FIG. 3A illustrates a block diagram for producing a hyperbranched polymer (HBP)-fluorosurfactant compound;

FIG. 3B illustrates a block diagram for producing a HBP-fluorosurfactant-aliphatic compound;

DETAILED DESCRIPTION

The particular values and configurations discussed in these non-limiting examples can be varied and are cited merely to illustrate embodiments of the disclosed compositions and methods and are not intended to limit the scope of the disclosure.

The present disclosure is directed toward a unique class of polymeric materials. These materials have two features of interest for the purposes of the present disclosure. The first feature comprises an efficient architectural design, whereby chemical functional groups are assembled at the molecular level and in high local concentrations. The materials utilized to create this chemical architecture can be commercially available hyperbranched polymers, which are available with a variety of different functional groups. The properties of the functional groups become amplified relative to materials with the same concentration of functional groups distributed uniformly throughout the material. These domains of dense functional groups "bloom" to the surface as a result of these strong interactions. By using this approach, far less additive has to be used. Note that that the term "bloom" or "blooming" is well known in the chemical arts and refers generally to a forced rising of particles or chemical compounds and elements to a surface through thermodynamic interactions thereof.

The second feature of such polymeric materials is that the surfaces of these materials can adapt to the environment by switching the exposed functional groups in order to optimize surface-environment interactions. This switching function can be envisioned as a "flip-flop" of functional groups, whereby one group buries itself while the preferred group migrates to the surface of the polymer or polymer-based solution. An important component is the molecular architecture that simultaneously increases surfactant efficiency and permits "delivery" of one or more chemical functionalities to the surface and/or interface.

Figure 1:
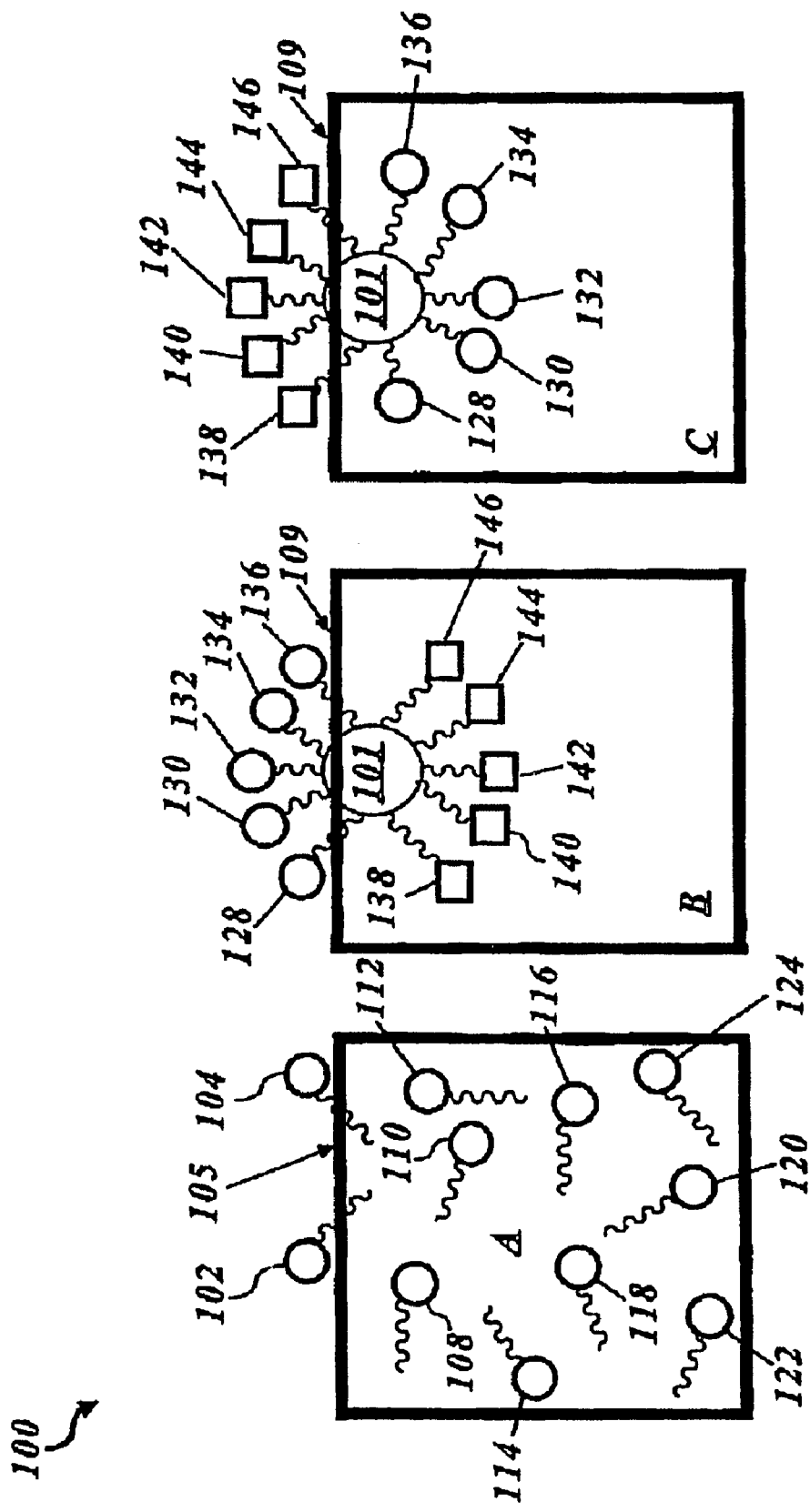
FIG. 1 illustrates block diagram depicting an adaptive polymer with fluorinated and hydrophilic groups, in accordance with a preferred embodiment of the present invention.

FIG. 1, as also shown in U.S. Pat. No. 6,855,773, illustrates a block diagram 100 depicting an adaptive polymer with fluorinated and hydrophilic groups. In FIG. 1, their schemes are illustrated including scheme A, which illustrates a polymer doped with a fluorinated surfactant wherein only a small amount of the polymer rises to the surface 105, beneath which lies a plurality of fluorinated groups 108, 110, 112, 114, 116, 118, 120, 122 and 124. Only a few fluorinated groups 102 and 104 rise to surface 105 according to scheme A. Scheme A represents a traditional method. The term "plurality" as used herein refers both to the terms "multiple" and/or "several," as shown in scheme A of FIG. 1, and also refers to the phrase "more than one" (e.g., can mean "two").

Scheme B, on the other hand, illustrates a hyperbranched chemical architectural approach, which can be implemented in accordance with the present invention, such that a high local concentration of groups brings many groups to the surface 109, including a plurality of fluorinated groups 128, 130, 132, 134, and 136, and a plurality of hydrophilic groups 138, 140, 142, 144, and 146, which are joined via a chemical bond 101. Note that surface 109 of scheme B is analogous to surface 105 of scheme A.

Scheme C, as shown in FIG. 1 and described in U.S. Pat. No. 6,855,773, depicts another feature of the present disclosure, which illustrates the switchability of the surface groups without disrupting the bulk of the polymer matrix. Note that in both scheme B and scheme C of FIG. 1, like or analogous parts are generally represented by identical reference numerals. Also, in schemes A, B, and C of FIG. 1, circular shapes generally represent fluorinated groups, while square shapes generally represent hydrophilic groups. Further, as utilized herein the term "polymer" generally refers to compounds with large or very large molecules made up of repeating molecular units. Thus, based on the configuration depicted in FIG. 1, it can be appreciated that the properties of the functional groups become amplified relative to materials with the same concentration of functional groups distributed uniformly throughout the materials. These domains of dense functional groups "bloom" to the surface 109 as a result of these strong interactions. By using this approach, far less additive has to be utilized. As indicated in scheme C of FIG. 1, surfaces such as surface 109 can adapt to the environment by switching the exposed functional groups in order to optimize surface environment interactions.

Preliminary proofs of concept experiments can be carried out, which clearly demonstrate the surface activity and switchability potential of fluorinated dendritic polymer additives. Water can be utilized to probe the contact angle, hence surface free energies, of cured vinyl ester resin as a function of concentration of fluoro-additive. To establish a baseline response, Du Pont ZONYL® fluoro-surfactant (methacryl functional) can be added to Dow DERAKANE® 411-C-350 vinyl ester resin in weight percentages ranging from, for example, approximately 0.0% to 9.6%. The resultant advancing and receding contact angle of water on the surface of the vinyl ester changes very little as the concentration of fluoro-surfactant is increased (e.g., 62.3° advancing and 42.0° receding).

As described in U.S. Pat. No. 6,855,773, to increase the activity of the fluorinated surfactant, the Zonyl® can be chemically bonded to a commercial BASF LUPASOL® amine functional hyperbranched polymer via an additional reaction between the methacryl groups of the Zonyl® and the amine groups of the Lupasol,® prior to the incorporation into the vinyl ester resin. Note that although the present disclosure is discussed in the context of a vinyl ester resin, it can be appreciated by those skilled in the art that the technology described herein can apply to any polymeric, oligomeric thermoset, and/or thermoplastic material. Thus, a vinyl ester resin can be replaced with, for example, any polymeric, oligomeric thermoset, and/or thermoplastic material. The use of a vinyl ester resin is described here for general illustrative purposes only.

Figure 2:
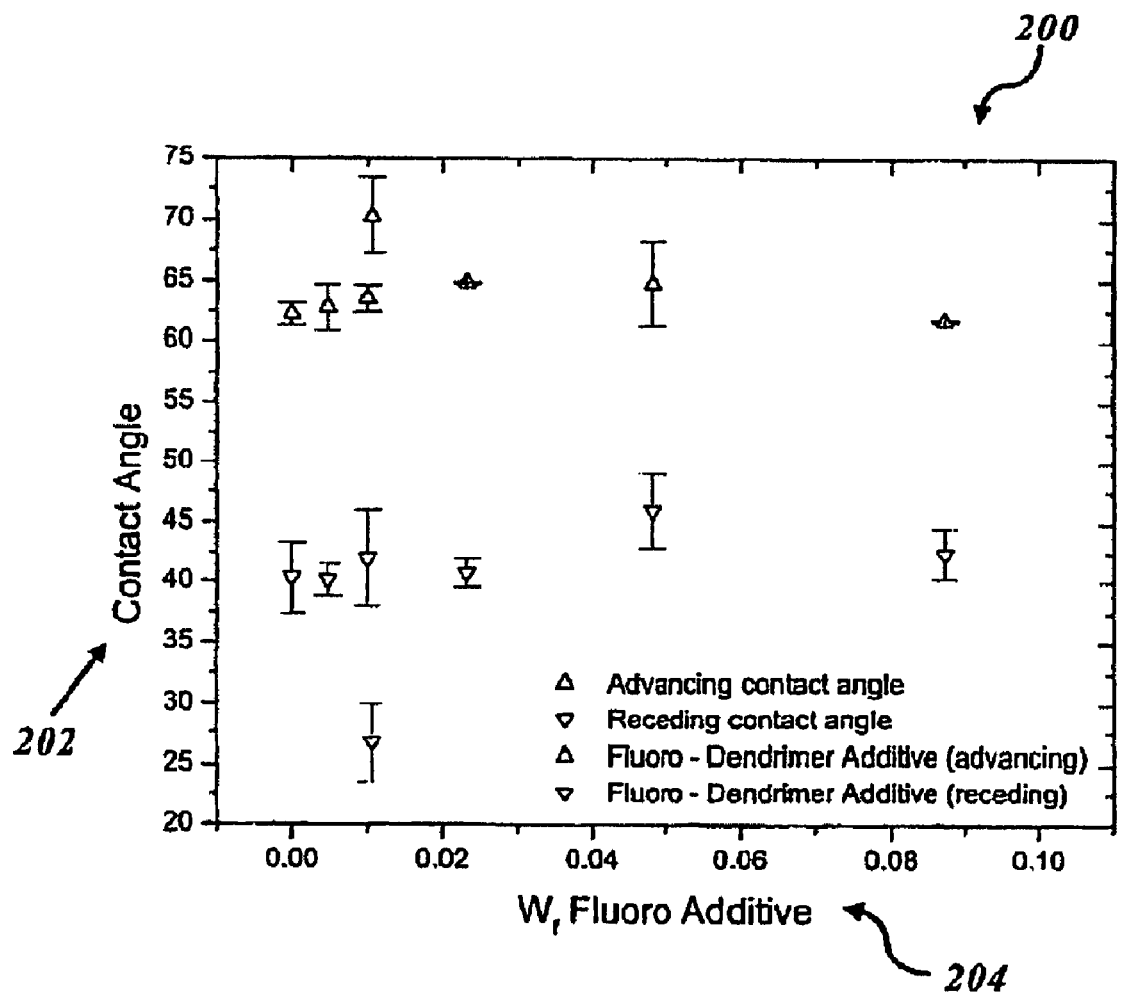
FIG. 2 depicts a graph illustrating a summary of contact angle results, which illustrate increased surface activity of a fluoro-surfactant when bonded to the pendant groups of a polymeric dendrimer, in accordance with a preferred embodiment of the present invention.

An additional reactive product can thus be added to the vinyl ester resin to yield a concentration of, for example, 1.5 wt. % Lupasol® (i.e., functional group) pre-reacted with 1.0 wt. % Zonyl®. The change in the advancing and receding contact angles can be dramatic. The advancing contact angle can increase from 62.3° to 70.3°, due to the hydrophobic nature of fluorine, and the receding contact angle can decrease from 42.0° to 26.8°, presumably due to the surface fluorine groups switching to the more energetically favorable and hydrophilic unreacted amine groups of the Lupasol® polymer. It should also be noted that the addition of 1.5 wt. % Lupasol to the vinyl ester resin will generally not affect either the advancing or receding contact angle. A summary of preliminary contact angle data is displayed in FIG. 2, which depicts a graph 200 illustrating a summary of contact angle results, which demonstrate increased surface activity of a fluoro-surfactant when bonded to the pendant groups of a polymeric dendrimer. Graph 200 thus represents a plot of contact angle values along a y-axis 202 versus fluoro-additive values along an x-axis 204.

Based on the foregoing it can be appreciated that methods and systems for modifying a polymer are disclosed herein. According to such methods and systems, a solution can be generally provided having a surface thereof, in which the solution comprises a plurality of hyperbranched polymers. The plurality of hyperbranched polymers can be chemically bound to a plurality of surfactants in order to modify the surface and produce a polymeric material thereof. The surface can be tailored with a plurality of functional groups that self-assemble and are deliverable to the surface of the solution, including interfaces thereof, thereby permitting a high-density assembly of functional groups to operate in concert with one another in order to generate a modified surface thereof. The polymeric material produced thereof can be reversibly adaptable to environmental conditions through a blooming of varying surface functional group to the surface of the solution.

As further described in U.S. Pat. No. 6,855,773, the embodiments described in the present disclosure offer a number of advantages, and as indicated previously, technology has been developed which allows one to modify a polymer with ammonium salts in order to permit the ammonium salts to migrate to the surface. Prior technologies additionally rely on standard linear polymers and copolymers, whereas the present invention is particularly based on branched or hyperbranched polymer architectures. Therefore, not only can the materials differ by composition, but also by structure. Embodiments of the present invention also possess the ability to change functional groups at the surface, wherein such changes are environmentally induced (i.e., solvent exposure, humidity, etc). The polymeric materials can also be adapted for use as self-decontaminating materials for textiles and films, seeds for catalysts, catalytic sites, and chemical separation and membranes.

Also, as indicated previously, some technologies utilize dendritic polymers for coating applications. In one embodiment, the polymer is a dendritic or highly branched (or "hyperbranched") polymer "scaffold" (also referred to in the art as a "core" polymer or component) that is fully or partially functionalized with various groups (also referred to in the art as a "shell" polymer or component) and/or surfactants. Thus, the dendritic or hyperbranched polymers disclosed herein can be described as core/shell polymers with an interior and a reactive surface with a large number of reactive sites. The dendritic or hyperbranched interior structure generally provides a carrier function, with the surface functional groups determining the final chemical and physical properties of the entire unit. The properties of the disclosed dendritic or hyperbranched polymers can also be affected by changing either the core or the hyperbranched structure itself. Hereinafter, the term "hyperbranched polymer" or "HBP" will be used to describe both highly and imperfectly branched polymers, as well as dendrimers.

In the disclosed HBPs, all reactive sites can be functionalized with the same moiety, or only some of the reactive sites can be functionalized. Additionally, some reactive sites can be functionalized for one property while other reactive sites can be functionalized to control one or more other properties, e.g., polarity, viscosity, tensile modulus, glass transition temperature, etc. The disclosed HBPs can be designed for specific applications in which multiple properties may be desired. Thus, the type of group incorporated on the surface will govern the end use, with different types of functional groups giving different properties.

One functionality or set of functional groups of the HBP can be used to interact with a polyoxoanion to transport preselected material to the surface of a polymer film or a matrix. By transporting desired material to the surface of the film or matrix, the surface can be modified by adding only small amounts of the desired functional group to the hyperbranched polymer.

In general, one exemplary method of producing the disclosed compositions includes modifying a HBP scaffold by reacting it with a fluorosurfactant, or any low free energy chain, to produce a HBP scaffold with the fluorosurfactant (or low free energy chain) added thereto, as depicted in FIG. 3A. The modified HBP-fluorosurfactant compound can then be further modified by reacting it with an aliphatic compound (e.g., an aliphatic epoxy) to a produce a HBP-fluorosurfactant molecule with the aliphatic epoxy added thereto, as illustrated in FIG. 3B. By employing a HBP with mixed end groups (e.g., perfluorinated, aliphatic), the solubility of the HBP is enhanced.

Figure 3C:
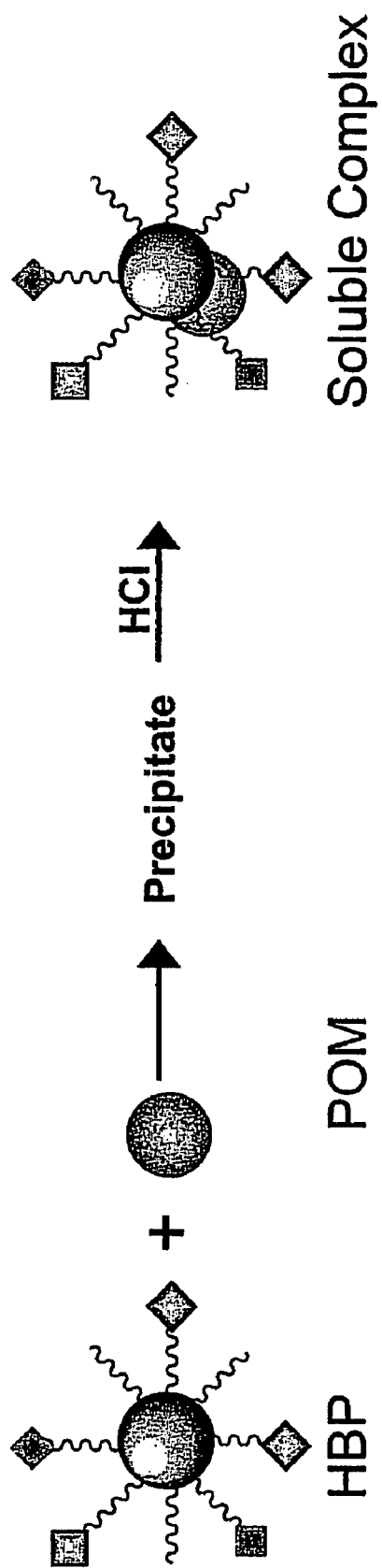
FIG. 3C illustrates a diagram for producing a HBP-fluorosurfactant-aliphatic-POM complex.

The twice-modified HBP (e.g., HBP-fluorosurfactant-epoxy compound) can then be reacted with one or more polyoxometalates (POMs) to form an HBP-POM complex precipitate, as shown in FIG. 3C. Adding an acid to the HBP-POM complex will solubilize the HBP-POM complex. In one embodiment of the method, the acid is added in a stoichiometric amount with respect to the amines. The soluble HBP-POM complex can then be added to various films. In place of the POM, the twice-modified HBP can be reacted with other functional groups to provide the HBP with other functionalities such as an acid site, a base site, a decontamination agent, a biocide and or a biological/binding site.

The polymer scaffold can be a number of different HBPs, such as for example, but not limited to, branched polyimines (including polethyleneimine, as indicated here, PEI) or branched polyesters. Additional polymer types will be apparent to those skilled in the art, but include a wide range of chemistries as well as molecular architectures. The HBP scaffolds disclosed here represent any sort of oligomeric or polymeric chain comprised of short-chain (i.e., non-entangling) or long-chain branching (i.e., entangling) combined with a plurality of residual functionalities; the resulting HBP may therefore include representatives from the following architectural types: dendrimer, hyperbranched polymer, comb-polymer, dendri-graft polymer, star polymers, $A_2+B_3$ systems (or any $A_n+B_y$ system where $n \geq 2$, and $B \geq 3$), linear polymer with pendant functional groups, and other polyfunctional materials, of or any of which may be referred to herein generally as "HBP." Likewise the arena of polymer chemistries may be expanded to include condensation polymers and addition polymers, including polyamines, polyetherimides, polyetheramides, polyetherketones, polyamides, polyimides, polyethers, polyureas, polyurethanes, polycarbamates, polysaccharides, polyvinyl chains (e.g., polyethylene, polypropylene, polyvinyl alcohol, polyvinyl amine). It is expected that chains derived from any polymerization technique could be used to prepare these scaffold materials, including standard condensation chemistry, free radical polymerization, stabilized radical polymerization (e.g., atom transfer radical polymerization (ATRP) and self condensing vinyl polymerization (SCVP)), or chain walking polymerization.

The fluorosurfactant can be a number of different fluorosurfactants, of the general formula $R_f$-X. The $R_f$ term relates to a fluorinated segment of indeterminate length, generally from about 3 to about 50 atoms long, containing minimally carbon and fluorine, and potentially other atoms such as oxygen and hydrogen. It is understood by those skilled in the art that, for instance, perfluorinated polyether segments would function in a similar fashion as a completely perfluorinated alkyl chain. The X component of the general formula given above relates to the chemical functionality by which the $R_f$ portion may be attached to the HBP scaffold, and includes but is not limited to X=Cl, Br, I, —OH (alcohol), —NH$_2$ (amine), —COOH (carboxylic acid), —COOCH$_3$(ester), —COY (Y=Cl, Br; carboxylic acid halide), —OCOCZ=CH$_2$ (Z=H for acrylates, CH$_3$ for methacrylates), unsaturated aliphatic segments including allyl, alkenyl, and alkynyl groups, epoxides, sulphonic acid group, isocyanate group, silane groups, or combinations thereof. The preceding list is illustrative and is not exhaustive.

In some embodiments, a fluorosurfactant can be used that has the following formula:

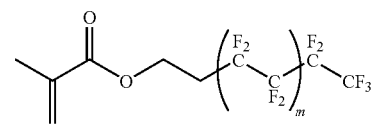

where m can be 2-4.

In place of the surfactant, any low free energy chain polymer can be used. In some systems surface segregation effects can be observed even in the absence of perfluorinated segments, due to the combination of high free energy matrices and low free energy chain ends. Other examples would include aliphatic groups (both saturated and unsaturated hydrocarbons) and polysiloxanes, thus meeting the criteria for the $R_S$ groups referred to in the following description.

The aliphatic compound can be a number of different aliphatic compounds, such as for example, but not limited to an aliphatic epoxy. The solubilizing segment can be composed of a wide range of materials, of the general formula $R_s$—X. The $R_s$ term relates to a solubilizing segment of indeterminate length, generally from about 3 to about 50 atoms long, containing minimally carbon or silicon and hydrogen, and potentially other atoms such as oxygen. It is understood by those skilled in the art that, for instance, polyethylene glycol segments could function in the same solubility enhancing fashion as an alkyl chain, depending upon the polarity of the intended solvent. Likewise, short polydimethylsiloxy chains could be used to improve solubility and enhance the thermodynamic driving force for phase segregation. The X component of the general formula given above relates to the chemical functionality by which the $R_s$ portion may be attached to the HBP scaffold, and includes but is not limited to X=Cl, Br, I, —OH (alcohol), —NH$_2$, —COOH (carboxylic acid), —COOCH$_3$(ester), —COY (Y=Cl, Br; carboxylic acid halide), —OCOCZ=CH$_2$ (Z=H for acrylates, CH$_3$ for methacrylates), unsaturated aliphatic segments including allyl, alkenyl, and alkynyl groups, epoxides, sulphonic acid group, isocyanate group, or silane groups. The preceding list is illustrative and is not exhaustive. In some embodiments, an aliphatic epoxy that can be used has the following formula:

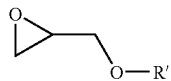

where R' can be $C_{12}H_{25}$—$C_{14}H_{29}$.

The polyoxometalates (POMs) that can be used to complex with the modified HBPs include for example, but are not limited to H$_5$PV$_2$Mo$_{10}$O$_{40}$(H$_5$POM), Na$_5$PV$_2$Mo$_{10}$O$_{40}$ (Na$_5$POM), and combinations thereof, etc. These techniques are suitable for any polyanionic mixed metal oxide species, especially those composed of the mid- and early-transition metals. It is also understood that metal nanoclusters could similarly be transported, including those such as gold or silver nanoparticles. For examples, see Gouzerh, P.; Proust, A. Chem. Rev., 1998, 98, 77-111 and Coronado, E.; Gómez-Garcia, C. J.; Chem. Rev., 1998, 98, 273-296, both of which are incorporated herein by reference in their entireties. In addition to these POMs, simple metal oxides or nano-sized metal clusters may be transported through HBP-ligand action, by functioning as a "dendritic box," or through simple solvophobic stabilization.

The HBP-POM complex can be used in, or suspended at the surface of various matrix materials, such as for example, but not limited to a polymeric material, an oligothermoset material, and a thermoplastic material. In particular, in some embodiments, the matrix can be thermoplastic polyurethane (TPU), but also includes more traditional materials such as polystyrene, polymethylmethacrylate, nylon-6,6, and polyetherimides (e.g., ULTEM®, commercially available from General Electric Corp.). It is understood that the matrix may also be a coating material, preferably liquid dispersed, including oligomer-based resin systems and colloidal dispersion based systems. The transport of functional groups to a surface is enhanced by the homogenization of the additive and the matrix prior to solidification, so solution cast films (where both components are soluble) can be used, as can thermoset resin systems where reactive diluents are used to lower viscosity (e.g., styrene's use in vinyl ester resins).

EXAMPLE

Figure 4:
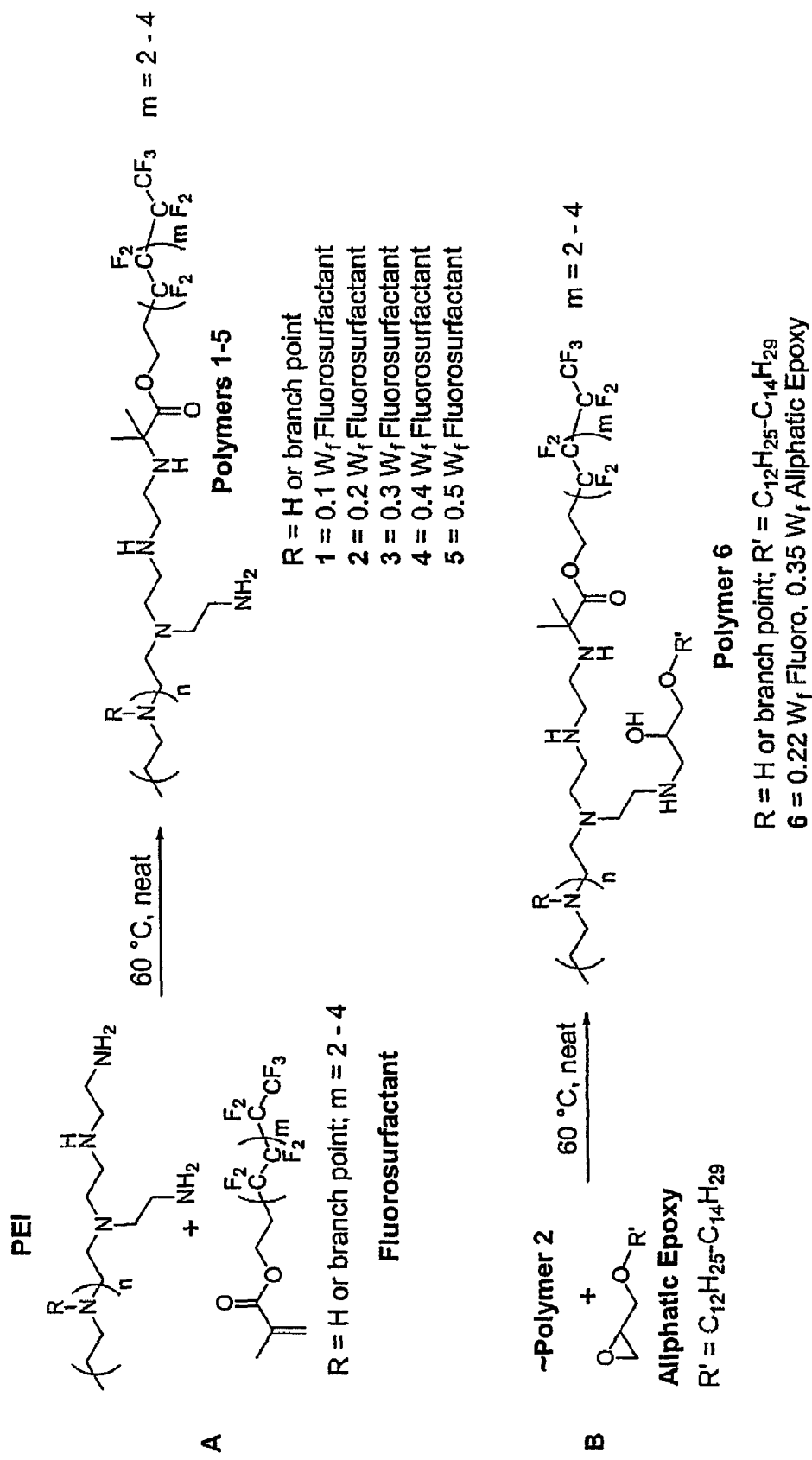
FIG. 4 illustrates reaction sequences in the production of an exemplary modified HBP.

One specific example of an HBP polymer scaffold that was studied is a branched PEI with a ratio of 1°:2°:3° amines of 1.0:0.91:0.64 and a molecular weight of about 1300 Da (n of about 30). The route employed for the modification of the disclosed PEI is depicted in FIG. 4. As shown in reaction A, methacrylated fluorosurfactants were added via Michael addition to the amine termini of the PEI polymer. The shift in carbonyl absorbance of the fluorosurfactant was tracked use Fourier Transform-Infrared (FT-IR) analysis, changing from 1728 to 1739 cm$^{-1}$ upon the consumption of the methacrylate group. The reaction took about 3 hours to reach completion at 60° C., neat.

As shown in reaction B of FIG. 4, the PEI polymer scaffold was also reacted with an aliphatic epoxy, which was added to the reaction mixture after the methacrylate of the fluorosurfactant had fully reacted. After an additional 2.5 hours, the reaction mixture was cooled. The modified HBP products were used without further purification. Examination of the polymer by proton ($^1$H) NMR confirmed that the consumption of the epoxy (coalescence of well-defined resonances confirmed ring-opening) group. Analysis with FT-IR also indicated the disappearance of the characteristic epoxy absorption at 915 cm$^{-1}$, and the —OH peak resulting from the epoxy ring-opening intensified and broadened the amine peaks arising from the PEI polymer backbone. The polymer exhibited improved solubility in common organic solvents, compared to PEIs lacking the aliphatic chains.

The highly-branched PEI polymer was then combined with two POMs with the molecular formulae H$_5$PV$_2$Mo$_{10}$O$_{40}$ (H$_5$POM) and Na$_5$PV$_2$Mo$_{10}$O$_{40}$ (Na$_5$POM). The HBP formed insoluble precipitates (green solids) upon treatment with the POMs, until the HBP was protonated with HCl (aq). Upon addition of the acid (stoichiometric with respect to the total amine content of the HBP backbone, including 1°, 2°, and 3° amines), the precipitate gradually become soluble in THF. After several minutes, the green solutions lightened in color to yellow.

Figure 5:
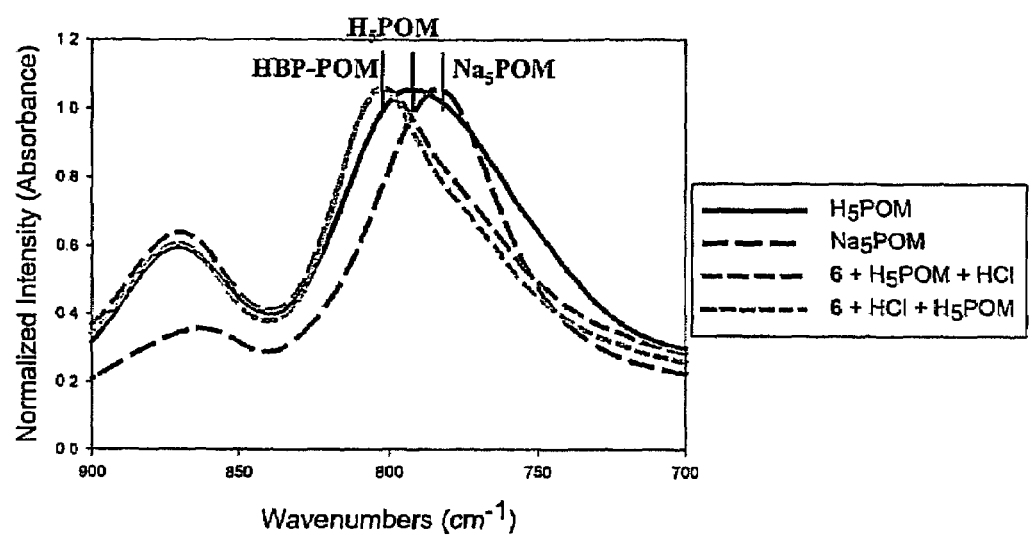
FIG. 5 illustrates a graph of the countercation determination of an exemplary HBP-POM complex in Fourier Transform-Infrared analysis (FT-IR); the behavior of the HBP-POM complex is indicated by the FT-IR data, suggesting displacement of the initial countercations ($Na^+$, $H^+$) by the ammonium cations of the HBP.

The resulting HBP-POM complex was examined by FT-IR. The chief vibrational resonance influenced by the countercation (initially H$^+$, Na$^+$) caused about 10 wavenumber difference in a peak near 790 cm$^{-1}$. As shown in FIG. 5, the resulting complex exhibited a third peak near 800 cm$^{-1}$, caused by the formation of the ammonium salt-POM complex. The shift to the new peak regardless of the original countercation suggests that the proton and sodium are displaced by the ammonium salt, providing the basis for the HBP-POM complex.

Similar HBPs have shown the ability to segregate and concentrate at the surface of a vinyl ester cross-linked film. The disclosed HBPs transport other functional groups by virtue of the fluorosurfactant "buoy" groups on the periphery of the HBP. Films were prepared using a thermoplastic polyurethane (TPU) solution and solutions of the HBP-POM complex. Appropriate quantities of each solution were combined to yield a net 1 wt % POM composition for the blend, relative to the quantity of TPU.

Various loading levels were investigated, as shown in Table 1 below. The relative quantity of HBP in the HBP-POM complex was varied, to keep the quantity of POM constant in the solutions. Films of the TPU with HBP-POM were cast onto silicon surfaces, and the solvent was allowed to evaporate slowly under small enclosures (e.g., petri dishes). A sample was also prepared for comparison that contained only the TPU and POM without the HBP. The contact angle analysis that was performed provides an indication of HBP surface migration. The drop in contact angle as a function of HBP loading confirms that the amines of the HBP are near the surface of the film.

TABLE 1

Composition of HBP-POM Blended with TPU

| | TPU Equiv. | POM Identity | POM Equiv. | HBP Equiv. | Adv. Contact Angle | Std. Dev. |
|---|---|---|---|---|---|---|
| I | 1.0 | $H_5POM$ | 0.010 | 0.007 | 89.3 | 6.6 |
| II | 1.0 | $H_5POM$ | 0.010 | 0.014 | 47.2 | 6.1 |
| III | 1.0 | $H_5POM$ | 0.010 | 0.021 | 22.4 | 3.6 |
| IV | 1.0 | $Na_5POM$ | 0.010 | 0.007 | 63.6 | 5.1 |
| V | 1.0 | $Na_5POM$ | 0.010 | 0.014 | 19.6 | 1.5 |
| VI | 1.0 | $Na_5POM$ | 0.010 | 0.021 | 23.9 | 1.6 |
| POM | 1.0 | $Na_5POM$ | 0.010 | — | 85.4 | 1.3 |
| HBP | 1.0 | — | 0.000 | 0.014 | 16.6 | 0.4 |

Figure 6:
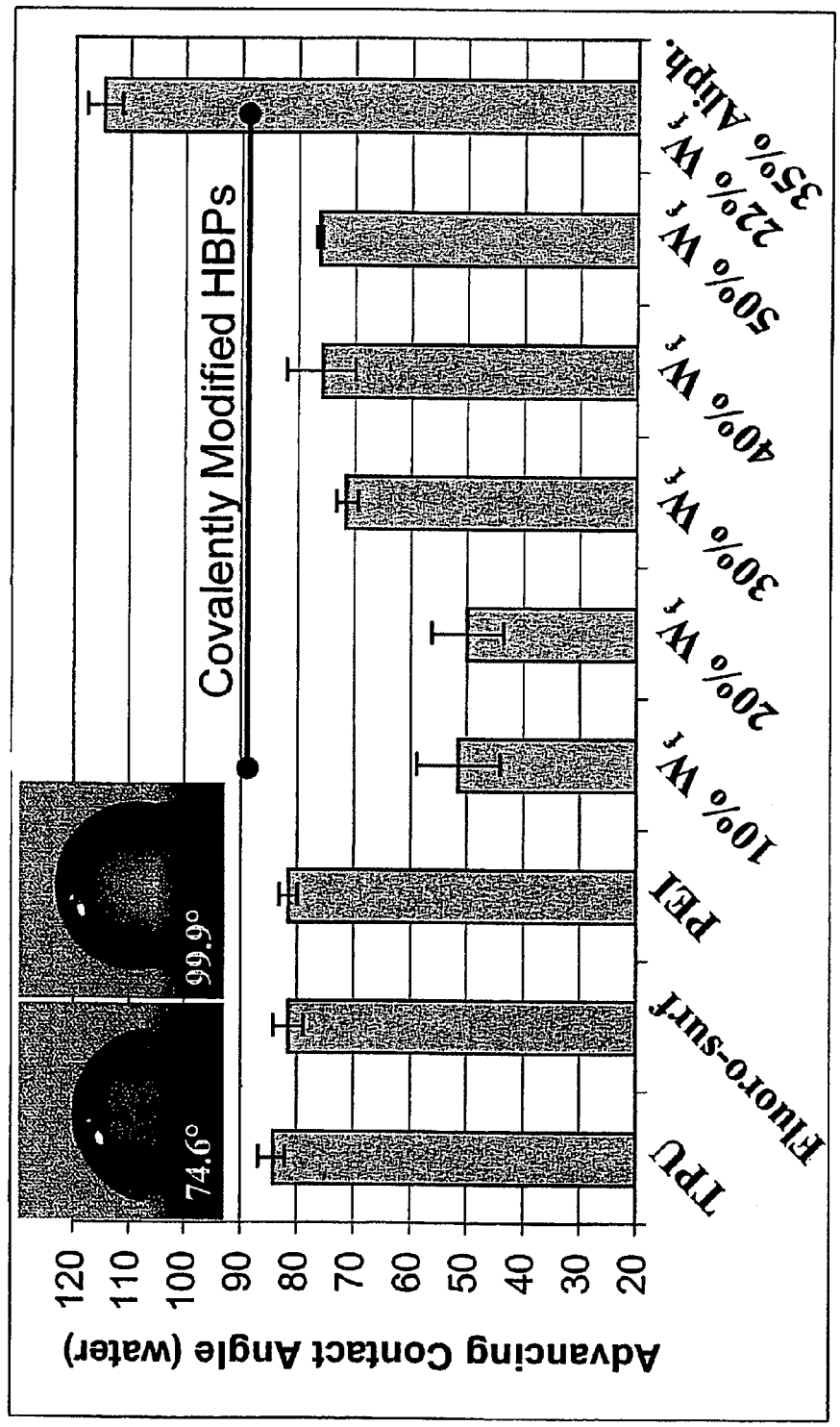
FIG. 6 illustrates a bar chart of the advancing contact angle of water on various exemplary covalently-modified HBP blends with thermoplastic polyurethane.

The results of the contact angle analysis are also summarized in the chart illustrated in FIG. 6. As illustrated in FIG. 6, the perfluorinated chains have limited effect on contact until they are coupled to the HBP. Additionally, it can be seen that at the surface, amines will dominate the interactions with water.

The films were also examined by X-ray photoelectron spectroscopy (XPS), which provides information about the elemental composition of a surface. The results from the analysis are provided in Table 2 below.

TABLE 2

XPS Analysis of TPU Blended with HBP-POM

| | 90° TOA-Atomic Group | | | | 30° TOA-Atomic Comp. | | | |
|---|---|---|---|---|---|---|---|---|
| Polymer | C | F | Mo | O | C | F | Mo | O |
| POM + TPU | 79.32 | — | — | 18.09 | 82.75 | — | — | 15.62 |
| TPU + HBP | 64.28 | 13.52 | — | 9.59 | 68.23 | 12.90 | — | 7.84 |
| I | 61.61 | 10.31 | 2.90 | 24.02 | 60.54 | 17.48 | 2.34 | 18.33 |
| II | 61.65 | 14.51 | 2.31 | 19.11 | 60.25 | 22.18 | 1.99 | 13.30 |
| II | 62.11 | 16.56 | 1.73 | 16.26 | 60.14 | 23.56 | 1.54 | 11.82 |
| IV | 63.33 | 11.39 | 2.30 | 21.70 | 62.30 | 17.45 | 2.14 | 16.79 |
| V | 63.80 | 12.03 | 2.65 | 18.71 | 63.59 | 17.80 | 2.21 | 13.55 |
| VI | 63.61 | 13.49 | 2.10 | 19.09 | 58.66 | 24.10 | 1.94 | 13.68 |

In Table 2, the atomic composition at the film surface is given for each sample, with a take-off angle (TOA) of 90° and 30°. The 90° TOA information samples were taken from about 10 nanometers (nm) into the film surface, while the 30° TOA provides information to a depth of about 4 nm.

Figure 7B:
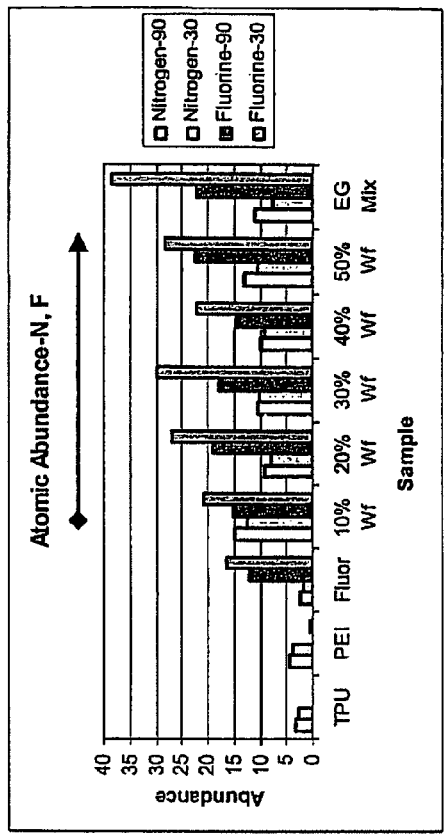
FIG. 7B illustrates a bar chart of the XPS analysis of various exemplary covalently-modified HBP blends, demonstrating the atomic abundance of nitrogen (N) and fluorine (F).
Figure 7A:
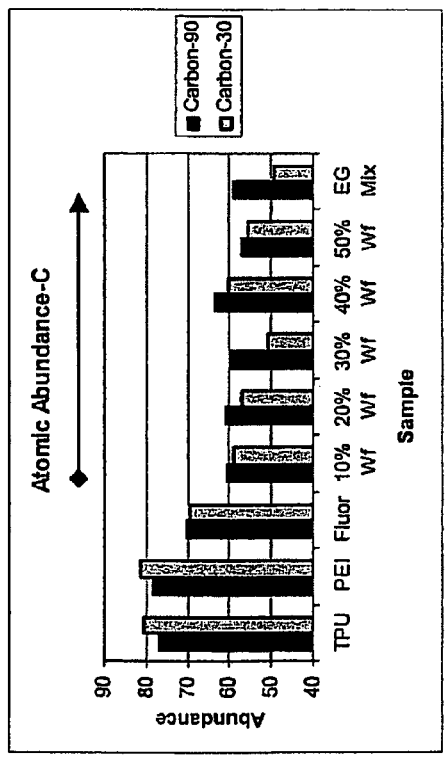
FIG. 7A illustrates a bar chart of the X-Ray Photoelectron Spectroscopy (XPS) analysis of various exemplary covalently-modified HBP blends, demonstrating the atomic abundance of carbon (C).

The results of the XPS analysis for various blends are also summarized in the charts illustrated in FIGS. 7A and 7B. As illustrated in FIGS. 7A and 7B, XPS confirms that increased F and nitrogen (N) are observed for HBP samples. The angle response indicates concentration gradient with depth. The more acute TOA (30°) samples a more shallow depth of the surface composition. The observed high concentrations of fluorine (relative to the 90° TOA) indicate preferential segregation of the perfluorinated segments at the topmost portion of the film surface, while the slight decrease in N content (comparing 30° to 90° TOA scans) indicates the HBP scaffolds are not exposed at the topmost surface in the XPS (hard vacuum) environment.

Addressing the control sample with TPU and POM first, no molybdenum (Mo) was observed in the XPS scans. The only source of Mo in the sample is from the POM, and its absence indicates that the POM does not preferentially segregate to the surface of the film in the control samples.

The second sample is the control sample containing only TPU and HBP. The presence of the HBP is confirmed by both the high quantity of fluorine (F) found at the surface, as well as the decrease in observed oxygen (O) content. This suggests that the HBP is preferentially segregating to the surface in a sufficient quantity to mask much of the oxygen observed in TPU.

The control sample results can be compared with those observed for the HBP-POM containing films. The observation of F at the film surface is a good indication that the HBP has successfully migrated to the film surface, and it corroborates the observations from the contact angle analysis. The appearance of Mo near the film surface is a strong indication that the HBP has successfully transported POM to the surface. This assertion is further bolstered when the oxygen content of the HBP-POM containing samples is considered. The amount of oxygen observed near the film surface is higher than for the HBP/TPU control.

Recall that the POM's studied in the instant Example possess a molecular formula of $X_5PV_2Mo_{10}O_{40}$. For each atom of Mo, the POM contributes four atoms of O. The presence of Mo, taken with the relative increase in O at the film surface confirms the transportation of the POM to the surface. It also suggests that the quantities of about 2.5% Mo at the surface are reasonable, as the O content has increased about 9-10%, compared to the HBP/TPU control sample. Assuming the level of about 2.5% Mo at the surface is correct, this represents an order of magnitude increase in POM concentration at the surface over its bulk concentrations. Having an increased POM concentration at a film surface can be used in, for example in decontamination technology. Adapted to the preparation of functional fibers for membrane preparation, the technology could be used to prepare flow-through membrane reactors, either for water decontamination or for some other mild oxidizing reaction (e.g., epoxidation). Other applications of POMs are indicated in the reference by Katsoulis, D. E., Chem. Rev., 1998, 98, 359-387, incorporated herein by reference in its entirety.

The disclosed methods and compositions combine the polyfunctional nature of a HBP to provide a tailored material that can migrate to a surface and transport a metal center to the surface. Thus, items can be made of known materials with a small quantity of an additive that provides massive modifications of surface properties. The disclosed dendrimers can be used, for example to control phase segregation in fluids. Amphiphilic HBPs can be used to sequester target compounds in the interior of the HBP. This serves as the concept for many dendrimer-based drug delivery systems, which typically also employ a tethered compound (e.g., antibodies) to direct the delivery of the therapeutic agent.

Figure 8:
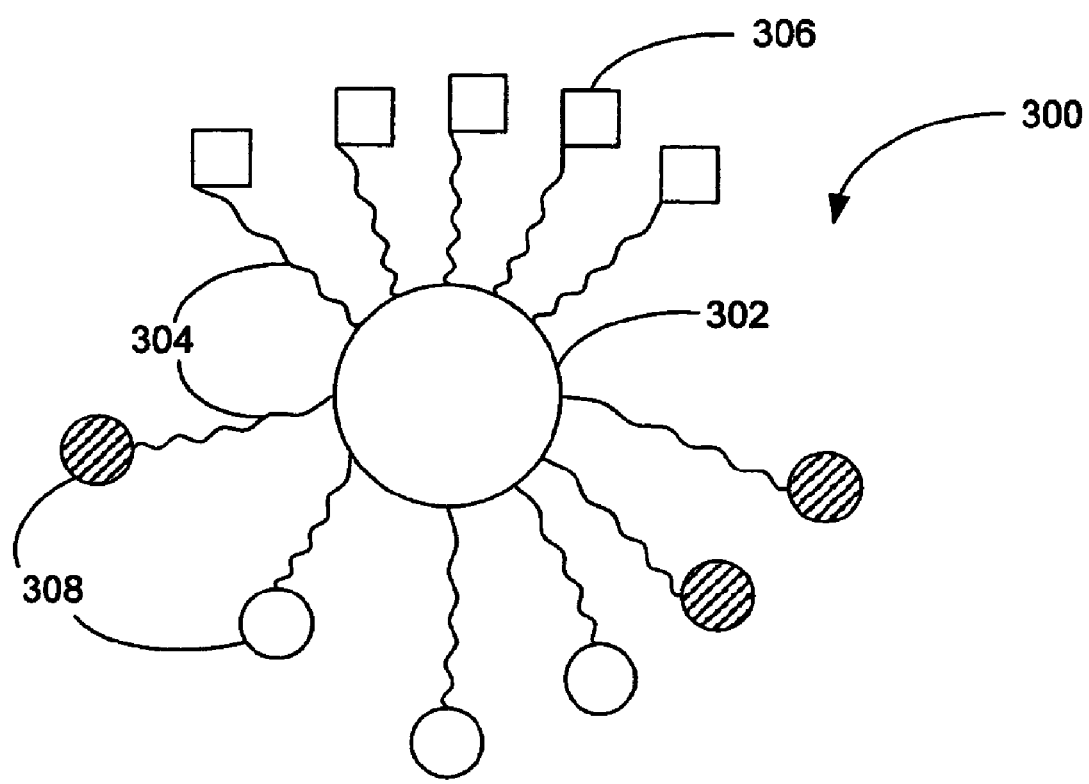
FIG. 8 illustrates an embodiment of an HBP.

An exemplary HBP 300 is depicted in FIG. 8. The HBP includes a polyfunctional core 302 to which linkages 304 attach buoy groups 306 and residual end chains and additional functional groups 308.

Thus, a polyfunctional core 302 is a molecule with multiple reactive sites that may be modified using normal chemical techniques and generally, a non-entangling species (either low molecular weight copolymer or highly branched polymer) with a high number of chain ends or pendant reactive groups. The polymers are constructed by most known techniques, including condensation, uncontrolled radical mechanisms, living radical mechanisms, anionic polymerization, or cationic polymerization.

Linkages 304 are reactive sites from the polyfunctional core 302 that have undergone reaction with a buoy 306 or other functional group (or chain) 308 and the nature of the linkage 304 is generally determined by the functionality of the core reactive sites (end or pendant groups). Potential linkages include amines, amides, imides, urethanes, carbamates, carbonates, ethers, esters, imines, ketones, silanes, siloxanes, as well as new C—C bond formation via coupling reactions, radical mechanisms, or the generic $SN^2$ or $SN^1$ mechanisms.

The term "buoy group" 306 as used herein refers to a moiety attached to the core molecule which has a surface (cohesive) energy lower than that of the core molecule. Generally, any low cohesive energy group may be suitable, including perfluorinated species, siloxanes, and hydrocarbon groups.

Residual chain ends and additional functional groups 308 can also be included in the disclosed HBPs. Polyfunctional core modification is governed by statistics, so there will almost always remain unreacted groups. If sub-stoichiometric amounts of buoy group are added, additional functional groups may be attached to the core to impart greater solubility or specific functionality, such as sensing sites, binding sites, reactive sites, acids, bases, etc. This category encompasses both residual unreacted sites and sites of specific functionality installed in addition to the buoy groups. These sites include a wide range of moieties, comprising amines, alcohols, acidic groups, basic groups, vinyl groups, halides, thiols, silanes, siloxanes, aliphatic groups, aromatic groups, and protected, latent, or masked sites.

Associated groups are groups bound to the modified core via electrostatic or dipole groups. The groups are generally amenable to direct covalent attachment, especially with an electrostatic charge, including polyoxometalates, conjugate bases, conjugate acids, anionic species, and cationic species.

The disclosed technology can effectively modify the surface of a polymer part during its preparation. The disclosed methods and compositions include surface energy modification combined with surface delivery and responsiveness to environmental changes. The disclosed methods and compositions can be used to make a wide variety of products and devices. For example, the disclosed composition can be used in and for adhesives, paints, coatings, signature management products, artificial tissues, sensors, decontamination equipment and devices, and wound treatment devices. The disclosed compositions have reversibility capabilities, such as disclosed in U.S. Pat. No. 6,855,773.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

It should be emphasized that the above-described embodiments, particularly, any "preferred" embodiments, are merely possible examples of implementations, and are merely set forth for a clear understanding of the principles set forth herein. Additionally, the step of any disclosed method can, optionally, be performed out of the order disclosed herein, and the methods may omit certain steps altogether. Many variations, substitutions, and modifications may be made to the above-described embodiment(s) without departing substantially from the spirit and principles herein. All such variations, substitutions, and modifications are intended to be included herein within the scope of this disclosure and the following claims.

Thus, at least the following is claimed:

1. A method for producing a modified hyperbranched polymer system, the method comprising the steps of:
    modifying a hyperbranched polymer (HBP) scaffold by addition of a fluorosurfactant to form a HBP compound with the fluorosurfactant substituent; modifying the HBP-fluorosurfactant compound by addition of an aliphatic compound to form a HBP compound substituted with the fluorosurfactant and the aliphatic substituent; and
    complexing the HBP compound substituted with the fluorosurfactant and the aliphatic substituent with a polyoxometalate (POM) to form a HBP-POM complex.

2. The method of claim 1, further comprising the step of:
    adding the HBP-POM complex to a matrix, wherein the matrix is chosen from at least one of the following: a polymeric material, an oligothermoset material; and a thermoplastic material.

3. The method of claim 2, wherein the matrix is chosen from at least one of the following: thermoplastic polyurethane, polystyrene, polymethylmethacrylate, nylon-6,6, polyetherimides, and combinations thereof.

4. The method of claim 3, wherein the HBP scaffold is chosen from at least one of the following: polyesters, polyethyleneimines, polyamines, polyetherimides, polyetheramides, polyetherketones, polyamides, polyimides, polyethers, polyureas, polyurethanes, polycarbamates, polysaccharides, polyvinyl chains, and combinations and copolymers thereof.

5. The method of claim 1, wherein the fluorosurfactant is chosen from at least one of the following:

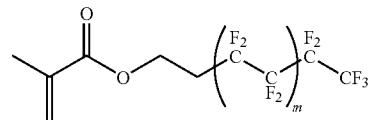

where m is 2-4.

6. The method of claim 1, wherein the aliphatic compound is an aliphatic epoxy.

7. The method of claim 1, wherein the aliphatic compound is chosen from the following formula:

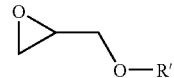

where R' can be $C_{12}H_{25}$—$C_{14}H_{29}$.

8. An interface-directed branched polymer transport system, wherein the system comprises:
    hyperbranched polymers (HBPs) in a matrix;

wherein the HBPs are complexed with polyoxometalate (POM) functional groups, wherein upon exposure to a contaminating substance to a surface of the matrix, the POM functional groups migrate to the surface of the matrix and decompose or inactive the contaminating substance.

9. The system of claim 8, wherein the wherein the HBP scaffold is a polymer chains derived from at least one of the following polymerization techniques: standard condensation, addition, free radical polymerization, stabilized radical polymerization, and chain walking polymerization.

10. The system of claim 8, wherein the matrix is chosen from at least one of the following: a polymeric material, an oligothermoset material, and a thermoplastic material.

11. The system of claim 8, wherein the POM is chosen from at least one of the following: $H_5PV_2Mo_{10}O_{40}$ ($H_5POM$) and $Na_5PV_2Mo_{10}O_{40}$ ($Na_5POM$).

12. A modified hyperbranched branched polymer (HBP) composition comprising:
a hyperbranched polymer modified with a plurality of first functional groups and a plurality of second functional groups, the plurality of first functional groups comprising perfluorinated chains and the plurality of second functional groups comprising aliphatic chains; and
wherein the hyperbranched polymer is further modified with a plurality of third functional groups, the third function groups being chosen from at least one of the following: polyanionic mixed metal oxides simple metal oxides and nano-sized metal clusters.

13. The modified HBP composition of claim 12 wherein the hyperbranched polymer is chosen from at least one of the following: dendrimer; comb-polymer; dendri-graft polymer; star polymer; $A_n+B_y$ system, where $n \geq 2$ and $B \geq 3$; linear polymer with pendant functional groups; and polyfunctional material.

14. The modified HBP composition of claim 12, wherein the first functional group is a fluorosurfactant of the formula $R_f$—X,
wherein $R_f$ is a fluorinated segment about 3 to about 50 atoms in length, and comprising fluorine and carbon atoms; and wherein X is chosen from at least one of the following: Cl; Br; I; —OH; —NH$_2$; —COOH; —COOCH$_3$; —COY, wherein Y is chosen from at least one of the following: Cl, Br, and carboxylic acid halide; —OCOCZ=CH$_2$, wherein Z is chosen from at least one of the following: H and CH$_3$; allyl groups; alkenyl groups; alkynyl groups; epoxides; sulphonic acid groups; isocyanate groups; silane groups; and combinations thereof.

15. The modified HBP composition of claim 12, wherein the first functional group is of the general formula $R_s$—X,
wherein $R_s$ is a solubilizing segment from about 3 to about 50 atoms in length and comprising containing hydrogen and at least one of carbon and silicon; and
wherein X is chosen from at least one of the following: Cl; Br; I; —OH; —NH$_2$; —COOH; —COOCH$_3$; —COY, wherein Y is chosen from at least one of the following: Cl, Br, and carboxylic acid halide; —OCOCZ=CH$_2$, wherein Z is chosen from at least one of the following: H and CH$_3$; allyl groups; alkenyl groups; alkynyl groups; epoxides; sulphonic acid groups; isocyanate groups; silane groups; and combinations thereof.

16. The modified HBP composition of claim 12, further comprising a matrix in which the modified hyperbranched polymer is disposed.

17. The modified HBP composition of claim 16, wherein the matrix is chosen from at least one of: a polymeric material, an oligothermoset material; and a thermoplastic material.

18. The modified HBP composition of claim 17, wherein the matrix is chosen from at least one of: thermoplastic polyurethane, polystyrene, polymethylmethacrylate, nylon-6,6, polyetherimides, and combinations thereof.

19. The modified HBP composition of claim 16, wherein the HBP composition has reversible functional groups positioned on a surface of the matrix wherein the reversible functional groups undergo reversible rearrangement at a surface of the matrix in response to a change in environment at the surface of the matrix.

* * * * *